June 5, 1923.

F. L. BAMFORD 1,458,021

TOASTING MACHINE

Filed April 9, 1920

FRANK L. BAMFORD, INVENTOR.

BY

ATTORNEY.

June 5, 1923.

F. L. BAMFORD

TOASTING MACHINE

Filed April 9, 1920

WITNESSES
Geo. M. Spring

FRANK L. BAMFORD
INVENTOR.

BY
Richard B. Owen
ATTORNEY.

Patented June 5, 1923.

1,458,021

UNITED STATES PATENT OFFICE.

FRANK LIVINGSTONE BAMFORD, OF DETROIT, MICHIGAN.

TOASTING MACHINE.

Application filed April 9, 1920. Serial No. 372,495.

*To all whom it may concern:*

Be it known that I, FRANK L. BAMFORD, a subject of King George V of England, residing at Detroit, in the county of Wayne and State of Michigan, U. S. A., have invented certain new and useful Improvements in Toasting Machines, of which the following is a specification.

This invention relates to new and useful improvements in machinery for toasting bread and other like victuals, the primary object of the invention being to provide a device which uniformly toasts bread and which will obviate any possibility of the bread being burned while toasting.

Another important object of the invention is to provide a device of the above nature which includes an oven and an endless conveyor passing therethrough and extending beyond the ends of the oven whereby bread or other victuals may be placed upon one end of the conveyor and conveniently removed from the opposite end after the same has passed through the oven.

Another object of the invention is to provide a device of this nature having heating elements disposed above and below the top or upper run of the conveyor, said heating elements extending the full length of the oven and approximately the full width of the conveyor whereby an even amount of heat will be distributed upon the articles being toasted.

Another object of the invention is to provide a device including heating elements which are maintained at a high degree of heat with the minimum consumption of fuel.

Other objects and advantages of the invention will become apparent during the course of the following description.

In the accompanying drawings forming a part of the application and wherein like numerals are employed to designate like parts throughout the several views Figure 1 is a side elevation of the device, parts thereof being broken away and sectioned.

Figure 1:
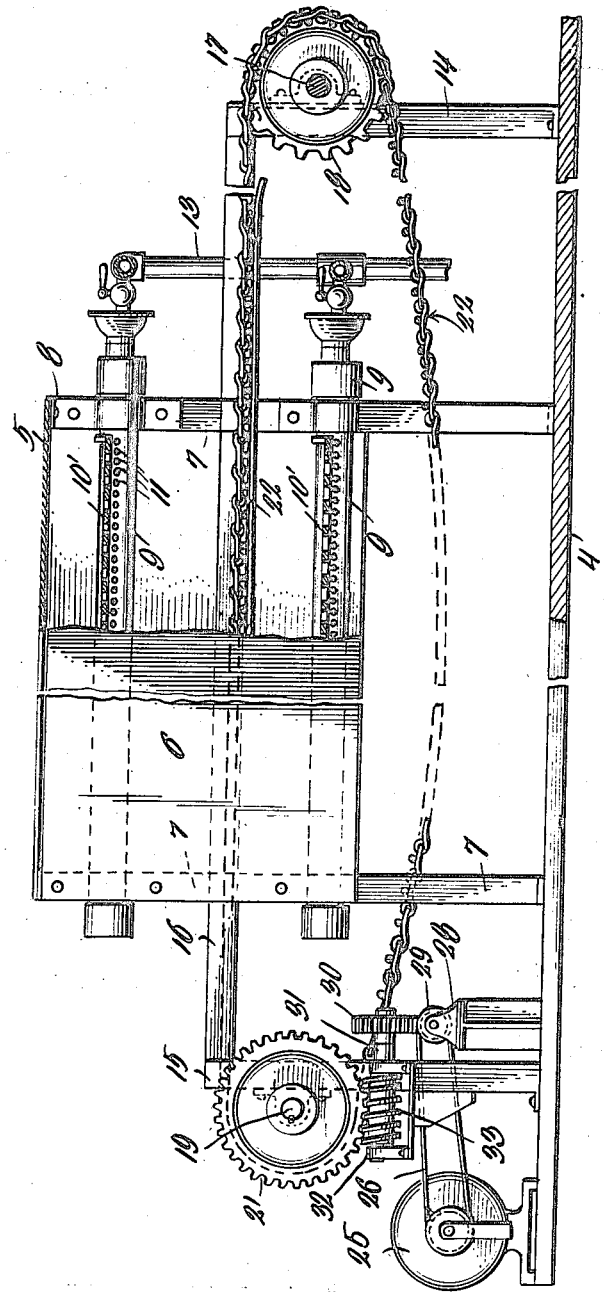

Referring to the drawings wherein for the purpose of illustration is shown the preferred embodiment of the invention, the numeral 4 designates a base by which the device may be suitably placed upon a table or other support, or in case the apparatus is used on a large scale, the numeral 4 designates the floor. The oven employed in my invention is of box like structure having a flat top 5 and a pair of sides 6, the latter being secured to the spaced pairs of legs 7 of a supporting structure, while the top 5 is supported upon the bridging portions 8 of each pair of legs 7. Due to the arrangement of the heating elements within the oven and the proximity at which one is arranged to the top 5, the latter may be used for frying purposes.

Two pairs of longitudinally extending parallel spaced burners are supported by means of brackets 10 within the confines of the sides of the oven and a heat radiating element 10' is supported between and by each pair of burners 9 in a plane about on a level with the horizontal center of its respective pair of supporting burners. These heat radiating elements or plates 10 are apertured or consist of a net work as shown, and extend the full length of the oven as well as approximately the width thereof for the purpose which will hereinafter appear. These heating plates are made up of a net work in order to promote the conduction of heat therethrough. As clearly shown in Figure 1, the burners are each provided at their inner sides with a horizontal line of apertures 11 whereby a flame will be spread out under the heating plates to uniformly heat the same. Bracket arms are provided along the longitudinal edges of the heating plate and are provided to overlap the burners for supporting the heating plate therebetween. An ordinary gas and air mixer 12 is provided for each burner at one end thereof and communicates with an arched supply pipe 13 as shown. A pair of vertical standards 14 are secured to the base 4 of a substantial distance from one end of the oven, while a similar pair of standards 15 are secured to the base at a substantial distance from the opposite end of the oven. A pair of spaced horizontal and parallel angle irons 16 forming guides extend through the oven and are connected at their ends to the standards 14 and 15.

Figure 2:
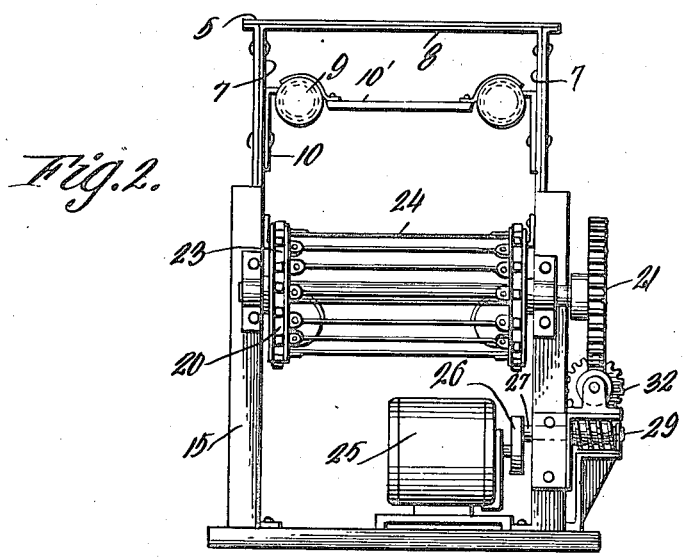
Figure 2 is an end elevation of the device.
Figure 3:
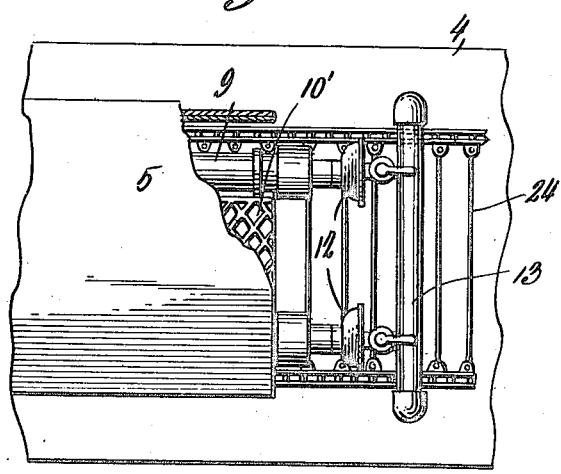
Figure 3 is a fragmentary top plan of the device with a portion of the oven top broken away to show the parts within the oven.

A transverse shaft 17 is journaled through suitable bearings mounted upon the standards 14 and a pair of sprocket wheels 18 are mounted upon the shaft one being arranged adjacent each standard 14. A shaft 19 extends transversely of the standard 15 and is mounted thereon as shown, and a pair of sprocket wheels 20 are mounted thereon as shown in Fig. 2. One end of the shaft 19 projects beyond the side of one of the standards as clearly shown in Fig. 2 and to this end of the shaft is secured a worm wheel 21.

An endless conveyor belt indicated in its entirety by the numeral 22 consists of a pair of sprocket chains 23 which are joined by a plurality of parallel spaced rods 24, as clearly shown in Figure 2. The upper run of the conveyor is supported by the horizontal portions of the angle iron guides so this run of the conveyor will not sag.

An electric motor or any other suitable source of power supplies motion to the conveyor through a drive belt 26 which imparts rotary movement to a shaft 27 journaled in bearings 28 and which is equipped with a worm 29. This worm meshes with a worm wheel 30 mounted upon a shaft 31 which is journaled in brackets 32. The shaft 31 is provided with a worm 33, which meshes with the large worm wheel 21 to impart movement to the large worm wheel 21 to impart movement to the shaft 19. The upper run of the conveyor travels toward the motive power, and slices of bread or other victuals are placed upon the upper run of the conveyor at the end opposite the motive power end thereof. As the conveyor travels slowly through the oven, the bread is given ample opportunity to thoroughly toast upon both sides, inasmuch as the upper run of the conveyor passes between the two heating plates 10'. Therefore, when the toast comes from the discharge end of the oven, or that end which is adjacent the motive power, the toast is thoroughly done and may be moved by the chef. If desired, a bread container may be associated with the feed end of the device and the conveyor provided with means for automatically taking slices of bread from the container, but, this feature is not illustrated nor specifically described as it is thought that the spirit of this feature is well understood and many different kinds of containers and arrangements may be devised to accomplish the above function.

The foregoing description and accompanying drawings have reference to what might be considered the preferred or approved form of my invention. I desire it to be understood that I may make such changes in construction, combination and arrangement of parts, materials, dimensions, et cetera, as may prove expedient and fall within the scope of the appended claims.

Having thus described my invention what I claim as new and desire to secure by Letters Patent is:—

1. A toasting machine comprising an oven, a foraminous conveyor having its upper run passing through the oven, a pair of horizontally disposed burners arranged above and below the said upper run of the conveyor, each pair of burners being arranged in spaced parallel relation to each other and the sides of the oven, the pair of burners which are arranged below the upper run of the conveyor being disposed between the runs of the conveyor and a heat radiating plate supported upon each pair of burners and extending from end to end and side to side of the oven to evenly distribute heat above and below the upper run of the conveyor.

2. An automatic toasting machine comprising an elongated oven, a conveyor formed from a plurality of spaced parallel rods, said conveyor having its upper run passing through the elongated oven, a pair of gas pipes extending longitudinally throughout the entire length of the oven and being arranged in horizontal spaced parallel relationship in proximity to the conveyor, a heat radiating plate being provided with a plurality of apertures, extending from pipe to pipe and having arms extending therefrom to overlap the pair of gas pipes for supporting the radiating plate, and the relative inner sides of said pair of pipes being provided with rows of gas outlet apertures arranged immediately below the heat radiating plate whereby flame from the gas pipes is caused to spread out over the under surface of the heat radiating plate, a second pair of gas pipes extending longitudinally of the oven and throughout its entire length, disposed below the upper run of said conveyor, a second heat radiating plate supported upon said pair of burners and extending from end to end and side to side of the oven to evenly distribute heat above and below the upper run of the conveyor.

In testimony whereof I affix my signature in presence of two witnesses.

FRANK LIVINGSTONE BAMFORD.

Witnesses:
  J. F. McLAUGHLIN,
  CARRIE SEMER.